United States Patent
Ohnishi et al.

(10) Patent No.: US 6,731,027 B2
(45) Date of Patent: May 4, 2004

(54) THREE-PHASE HYBRID TYPE STEPPING MOTOR

(75) Inventors: Kazuo Ohnishi, Gunma (JP); Toshimi Abukawa, Gunma (JP); Masafumi Sakamoto, Gunma (JP); Koki Isozaki, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/082,000

(22) Filed: Feb. 22, 2002

(65) Prior Publication Data
US 2003/0062779 A1 Apr. 3, 2003

(30) Foreign Application Priority Data
Aug. 28, 2001 (JP) .................................... 2001/257625

(51) Int. Cl.⁷ .............................................. H02K 37/14
(52) U.S. Cl. ...................... 310/49 R; 310/112; 310/114
(58) Field of Search .............................. 310/49 R, 112, 310/114

(56) References Cited

U.S. PATENT DOCUMENTS

| | | | | |
|---|---|---|---|---|
| 4,385,250 A | * | 5/1983 | Welburn | 310/162 |
| 4,873,462 A | * | 10/1989 | Harned | 310/49 R |
| 5,315,192 A | * | 5/1994 | Satomi | 310/49 R |
| 6,124,651 A | * | 9/2000 | Yoshimura et al. | 310/49 R |
| 6,160,330 A | * | 12/2000 | Sakamoto | 310/49 R |

FOREIGN PATENT DOCUMENTS

JP 02269458 3/1989

* cited by examiner

Primary Examiner—Nicholas Ponomarenko
Assistant Examiner—Nguyen N. Hanh
(74) Attorney, Agent, or Firm—Patterson, Thuente, Skaar & Christensen, P.A.

(57) ABSTRACT

A three-phase hybrid type stepping motor of the present invention comprises a stator, a rotor arranged concentrically with the stator and with an air gap therebetween, six stator poles extending radially and formed at a regular pitch on the inner peripheral surface of an annular stator yoke, each of the stator poles having a plurality of small stator teeth at the tip end thereof, the rotor having two splitted rotor elements and a permanent magnet held therebetween and magnetized so as to form N and S poles in the axial direction thereof, fifty of small rotor teeth formed at a regular pitch on the outer peripheral surface of each of the rotor elements, the two splitted rotor elements being shifted from each other in angular position by a ½ pitch of the small rotor teeth, wherein a permeance distribution of the small stator teeth is a vernier pitch balanced by a six or three order harmonic wave, and a ratio of the width of the pole tooth to the rotor teeth pitch is set to 0.35–0.45.

6 Claims, 4 Drawing Sheets

[TWELVE POLES] [SIX POLES]

(STAR CONNECTION)

(DELTA CONNECTION)

THREE-PHASE HYBRID TYPE STEPPING MOTOR

BACKGROUND OF THE INVENTION

1. Field of the Invention

The present invention relates to a three-phase hybrid type stepping motor, and more particularly to a three-phase hybrid type stepping motor having six magnetic poles with windings and a structure capable of reducing cogging torque and magnetic distortion rate and increasing an output.

2. Description of the Prior Art

A conventionally implemented three-phase hybrid type stepping motor has twelve magnetic poles with windings as shown in FIGS. 1A, 1B and 1C or six magnetic poles with windings as shown in FIGS. 2A, 2B and 2C.

The conventionally implemented three-phase hybrid type stepping motor shown in FIGS. 1A, 1B and 1C is composed of a stator 5 having twelve magnetic poles 2 arranged on the inner periphery of an annular yoke 1 at equal intervals, windings 3 wound around the respective magnetic poles 2 to form three-phase windings and multiple small teeth 4 provided at the tip end of each magnetic pole 2, and a rotor 9 having two splitted rotor elements 7, a permanent magnet 8 held therebetween and magnetized to two polarities of N and S in an axial direction, and fifty small teeth 6 formed on an outer periphery of each of the rotor elements 7 at a regular pitch, said rotor elements 7 being shifted from each other in angular position by a ½ pitch of the teeth 6, the rotor 9, the rotor 9 being opposed to the stator 5 with a gap therebetween, and rotatably supported by the yoke 1.

On the contary thereto, in the three-phase hybrid type stepping motor shown in FIGS. 2A, 2B and 2C, each of the rotor elements 7 has forty small teeth 6.

SUMMARY OF THE INVENTION

Japanese Patent Application No. 240691/2000 discloses the reduction of the cogging torque and the tertiary harmonic contents in the current wave form by arranging the pole teeth provided on the tip ends of the magnetic poles with windings at the vernier pitch wherein the permeance distribution is balanced by the six order harmonic contents with respect to the three-phase hybrid type stepping motor having six magnetic poles with windings.

A still further object of the present invention is to provide a three-phase hybrid type stepping motor, wherein the three-phase windings of the stator are connected in the form of delta.

These and other objects and features of the present invention will become apparent from the following description is conjunction with the attached drawings.

DESCRIPTION OF THE PREFERRED EMBODIMENTS

Figure 1A:
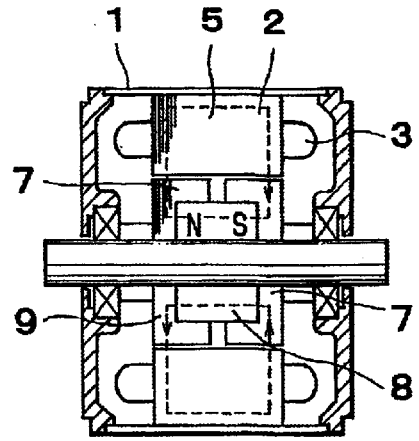
FIG. 1A is a vertically sectional front view of a conventional three-phase hybrid type stepping motor with twelve poles having windings.
Figure 1B:
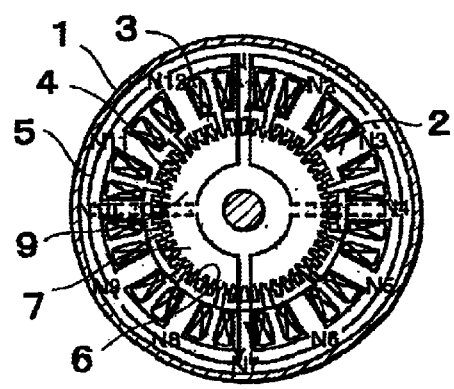
FIG. 1B is a vertically sectional left side (N pole side) view of a conventional three-phase hybrid type stepping motor shown in FIG. 1A.
Figure 1C:
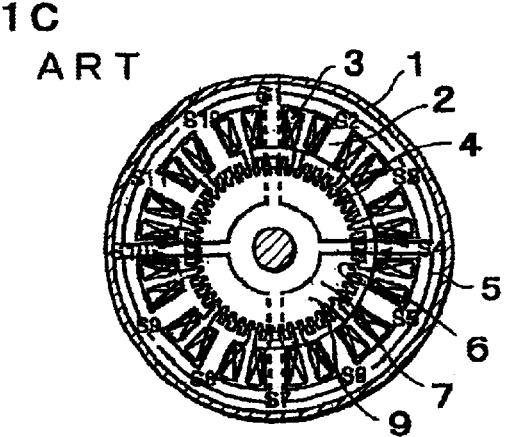
FIG. 1C is a vertically sectional right side (S pole side) view of a conventional three-phase hybrid type stepping motor shown in FIG. 1A.
Figure 2A:
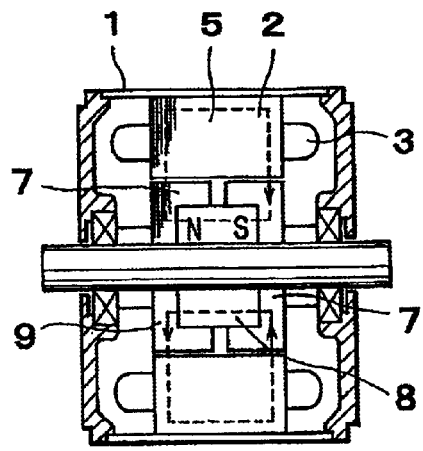
FIG. 2A is a vertically sectional front view of a conventional three-phase hybrid type stepping motor with six poles having windings.
Figure 2B:
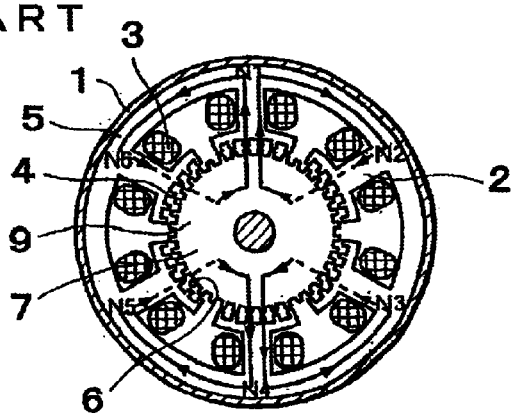
FIG. 2B is a vertically sectional left side (N pole side) view of a conventional three-phase hybrid type stepping motor shown in FIG. 2A.
Figure 2C:
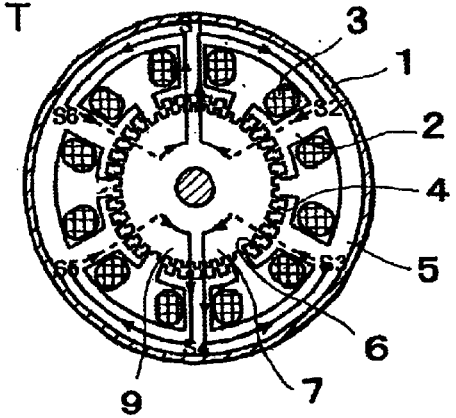
FIG. 2C is a vertically sectional right side (S pole side) view of a conventional three-phase hybrid type stepping motor shown in FIG. 2A.

In said three-phase hybrid type stepping motor, the number of the magnetic poles with windings is six and the number of the small teeth on the magnetic poles of the rotor is forty.

Here, the permeance distribution between the small teeth of the rotor and stator is analyzed by the method of the two-dimensional magnetic field analysis (FEM), when the arrangement of the small teeth of the rotor and the stator is varied, with respect to the three-phase hybrid type stepping motor having twelve magnetic poles with windings and the three-phase hybrid type stepping motor having six magnetic poles with windings.

Table 1 shows the performances of the three-phase hybrid type stepping motor having the small rotor pole teeth of fifty and twelve magnetic poles with windings and the three-phase hybrid type stepping motor having the small rotor pole teeth of fifty and six magnetic poles with windings, respectively.

TABLE 1

| PHASE NUMBER m | 3 | | | |
|---|---|---|---|---|
| WIRING | STAR | | DELTA | |
| NUMBER OF POLES WITH WINDINGS $n_w$ | 12 | 6 | 12 | 6 |
| FUNDAMENTAL STEP ANGLE $\theta_s$ | 1.2 | 1.2 | 1.2 | 1.2 |
| NUMBER OF TRANSISTOR | 6 | 6 | 6 | 6 |
| MAGNETIC FLUX OF WINDINGS $\Phi$ | 1.0 | 2.0 | 1.0 | 2.0 |
| GENERATED TORQUE T | 1.0 | 2.0 | 1.0 | 2.0 |
| TERMINAL INDUCTANCE | 1.0 | 1.0 | 0.75 | 0.75 |

As shown in the Table 1, the magnetic flux $\Phi$ of winding and the generated torque T of the stepping motor having six magnetic poles with windings are twice that of the stepping motor having twelve magnetic poles with windings, respectively.

According to the Faraday's law which is one of the basic laws in the electromagnetism, an induced voltage $e_1$ is expressed by Formula 1.

$$e_1 = -n_1 \frac{d\phi}{dt} = -n_1 \frac{d\phi}{d\theta}\frac{d\theta}{dt} = -n_1 \omega \frac{d\phi}{d\theta} \equiv -E_1 \cos p\theta \quad (1)$$

Here, $n_1$ denotes a total number of windings of one phase, $\Phi$ denotes a magnetic flux of the magnet passing through one turn of windings, $\omega$ denotes an angular velocity of the rotor, and $\theta=\omega t$.

The magnetic flux $\Phi$ can be expressed by Formula 2.

$$\Phi = \Phi \sin p\theta, \frac{d\Phi}{d\theta} = p\Phi \cos p\theta \quad (2)$$

Here, p denotes a number of teeth of the rotor, and $\Phi$ denotes a magnitude of the magnetic flux (peak to zero). Accordingly, Formula 3 can be obtained, if the peak to zero value (magnitude) of $e_1$ is $E_1$.

$$E_1 = n_1 p \omega \Phi \quad (3)$$

Here, $n_1$ denotes a total number of winding turns of one phase, $\phi$ denotes a magnetic flux of the magnet passing through one turn of windings, $\omega$ denotes an angular velocity of the rotor, and $\theta=\phi t$.

According to the Formula 3, it is noted that the induced voltage is in proportion to the number of $n_1$ of winding turns, the number p of rotor teeth, the angular velocity $\phi$, and the magnetic flux $\Phi$, respectively. On the other hand, an electrical input is $e_1 \times i_1$ when a current is passed through a winding which generates the induced voltage $e_1$. The electrical in put is equal to a mechanical output (torque $\tau$ angular velocity $\omega$ of rotor) of one phase as expressed by Formula 4.

$$\tau_1 \omega = e_1 i_1 \quad (4)$$

Formulas 5 and 6 can be obtained, if a phase of a current is equal to a phase of a reverse electromotive force (corresponding to the maximum output).

$$\tau_1 = \frac{e_1 i_1}{\omega} = n_1 p\Phi I_1 \cos^2 p\omega t \equiv T_1 \cos p\omega t \quad (5)$$

$$i_1 = I_1 \cos p\omega t \quad (6)$$

A total torque T is obtained by summing torques of three phases, and variable components are cancelled with each other, so that Formula 7 can be obtained.

$$T = \tau_U + \tau_V + \tau_W = T_1 \cos^2 p\omega t + T_1 \cos^2 p(\omega t - 2\pi/3) + \quad (7)$$
$$T_1 \cos^2 p(\omega t + 2\pi/3)$$
$$= \frac{3}{2} n_1 p\Phi I_1$$

According to the Formula 7, it is noted that the torque is in proportion to the magnetic flux $\Phi$.

Figure 3:
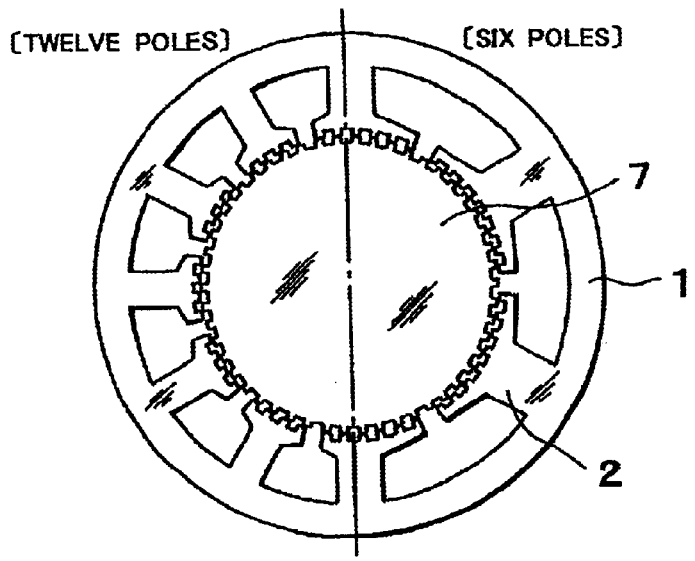
FIG. 3 is an explanation view of a stator core of a three-phase hybrid type stepping motor with six poles having windings and a stator core of a three-phase hybrid type stepping motor with twelve poles having windings.

FIG. 3 shows a half of the stepping motor having six magnetic poles with windings and a half of the stepping motor having twelve magnetic poles with windings. A total cross area of the slots of the stepping motor having six magnetic poles with windings is equal to that of the stepping motor having twelve magnetic poles with windings. Accordingly, the same value of current can be passed through the windings for each of the stepping motor, if a diameter of wire of the winding and a number of windings for one phase are equal in each stepping motor. However, the magnetic flux and the torque of the stepping motor having six magnetic poles with windings become twice as large as that of the stepping motor having twelve magnetic poles with windings, because the number of the pole teeth of one magnetic pole in the stepping motor having six magnetic poles with windings is 8 which is twice as large as that of the stepping motor having twelve magnetic poles with windings. A number p of the pole pairs of the stepping motor is larger remarkably than that of the normal permanent magnet motor, and the inductance L is large, so that the voltage drop p $\omega$ L becomes large and poor current is supplied at the high speed. It is important problem.

It is common knowledge to select the number of windings so that a predetermined rate of the reverse electromotive force is generated with respect to a terminal voltage applied to the motor, in case that the motor is to be driven. The Table 1 shows inductances calculated by Formula 8 in case that the number of windings is selected so that a voltage induced between terminals of each of the motors is constant. In the Table 1, the magnetic flux, torque and inductance etc. are shown in percentage terms to that of the motor having twelve magnetic poles with windings.

$$L_1 = \frac{\text{number of series windings of one phase}}{\text{number of parallel windings of one phase}} \times \quad (8)$$
$$(\text{number of winding turns of one pole})^2 \times$$
$$\text{permeance of one pole} = \frac{n_s}{n_p}\left(\frac{n_1}{n_w/m}\right)^2 \frac{P_T}{n_w}$$

Figure 4A:
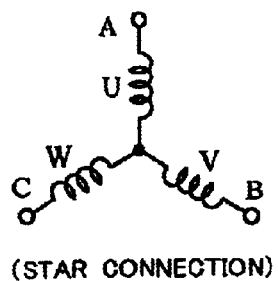
FIG. 4A is an explanation view of a wiring system of a three-phase hybrid type stepping motor with six poles having windings.
Figure 4B:
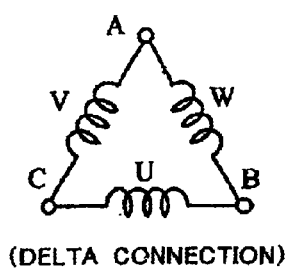
FIG. 4B is an explanation view of a wiring system of a three-phase hybrid type stepping motor with six poles having windings.

Here, $n_s$ is a number of series windings (in proportion to $n_w/m$), $n_p$ is a number of parallel circuits, $n_w$ is a number of poles, m is a number of phase, and $P_T$ is a total air gap permeance. According to the Formula 3, $n_1$ is reduced by one half and as a result that the values in the Formula 8 are not varied, when $n_w$ is reduced by one half and $\Phi$ is increased twice, because the $n_1$ is in reverse proportion to $\Phi$ if the induced voltage between the terminals is constant. The wiring system will now be explained hereunder. As shown in FIG. 4A and FIG. 4B, one of a star connection and a delta connection is used in the three-phase motor. In a two phases—two phases driving system which is a typical driving system wherein a current is passed always through windings of two phases among windings of three phases, a current is passed through U phase and V phase in the star connection, because a power source is connected to a series circuit formed between arbitrary two terminals (A and B, for example) among three terminals A, B and C shown in FIG. 4A, and a current is passed through W phase and V phase in the delta connection, because the power source is connected to a parallel circuit formed between arbitrary one terminal (A, for example) and other two terminals (B and C) shown in FIG. 4B. The number $n_1$ of windings of one phase in the star connection must be $1/\sqrt{3}=0.577$ times as large as that in the delta connection. The number $n_1$ of series windings is 2 in the star connection, whereas 1 in the delta connection. The number $n_p$ of parallel windings is 1 in the star connection, whereas 2 in the delta connection. Accordingly, the inductance in the star connection becomes 1, whereas the inductance in the delta connection becomes 0.75 according to the calculation of the Formula 8. This means that in the delta connection a higher speed operation can be realized, because the inductance between the terminals is smaller.

Table 2 shows a result of the simple calculation by the two dimensional FEM magnetic field analysis with respect to the hybrid type stepping motor.

TABLE 2

| NUMBER OF POLES WITH WINDINGS | 12 | 6 |
|---|---|---|
| MAGNETIC FLUX RATE OF POLES WITH WINDINGS | 17.3 | 35.6 |
| DESTORTION RATE OF MAGNETIC FLUX WAVE FORM | 1.31 | 0.96 |
| COGGING TORQUE | 100 | 28 |
| VERNIER SYSTEM | 4 ORDER | 6 ORDER |

$$\theta v = \frac{360}{p} \pm \frac{360}{pnQ} \text{(degrees)} \qquad \text{Equation 9}$$

In the vernier system, a four order cancel system (6.75° pitch) is used with respect to the twelve magnetic poles with windings, whereas a six order cancel system (7.05° pitch) is used with respect to the six magnetic poles with windings. The ratio of the magnetic fluxes of the magnetic poles with windings shows a rate of effective utilization of the magnetic flux of the magnet, and it is considered that the value is in proportion to the magnetic flux of the magnetic poles with windings, because the magnetic flux issued from the magnet becomes constant substantially.

The magnetic flux in case of the six magnetic poles with windings becomes twice as large as that in case of the twelve magnetic poles with windings. The number of pole teeth formed on one magnetic pole in case of the six magnetic poles with windings becomes twice as large as that in case of the twelve magnetic poles with windings and, accordingly, the pole teeth are deviated a little with one another, so that a smoothed wave form can be obtained entirely and that the distortion rate and the cogging torque may be reduced.

Figure 5:
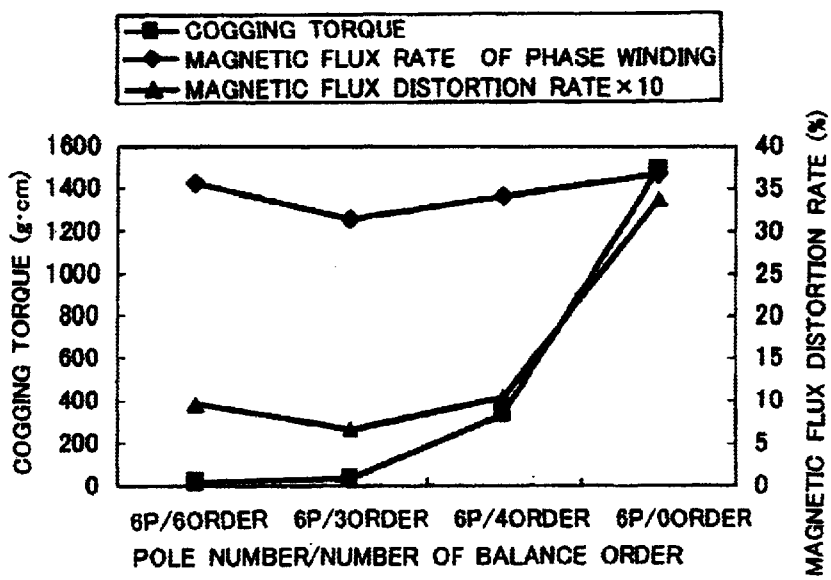
FIG. 5 is a diagram showing characteristic features of the cogging torque, magnetic flux, and distortion rate of the magnetic flux wave form of the three-phase hybrid type stepping motor with six poles having windings.

FIG. 5 shows a result of the detailed calculation by the two dimensional FEM magnetic filed analysis with respect to the six magnetic poles with windings.

In the three-phase motor, the balance harmonic wave for minimizing the cogging torque is six order, but the normal motor is four order, so that it is considered that the balance harmonic wave of three order is effective to reduce the tertiary harmonic wave. Accordingly, the cogging torque, magnetic flux, and rate of distortion of the magnetic flux are calculated with respect to four kinds items including one having no vernier. The ratio of the width of the stator pole tooth to the rotor small tooth pitch is set to 0.4 which is considered as the best. It is judged that the six order balance is the best in consideration of each performance totally.

Figure 6:
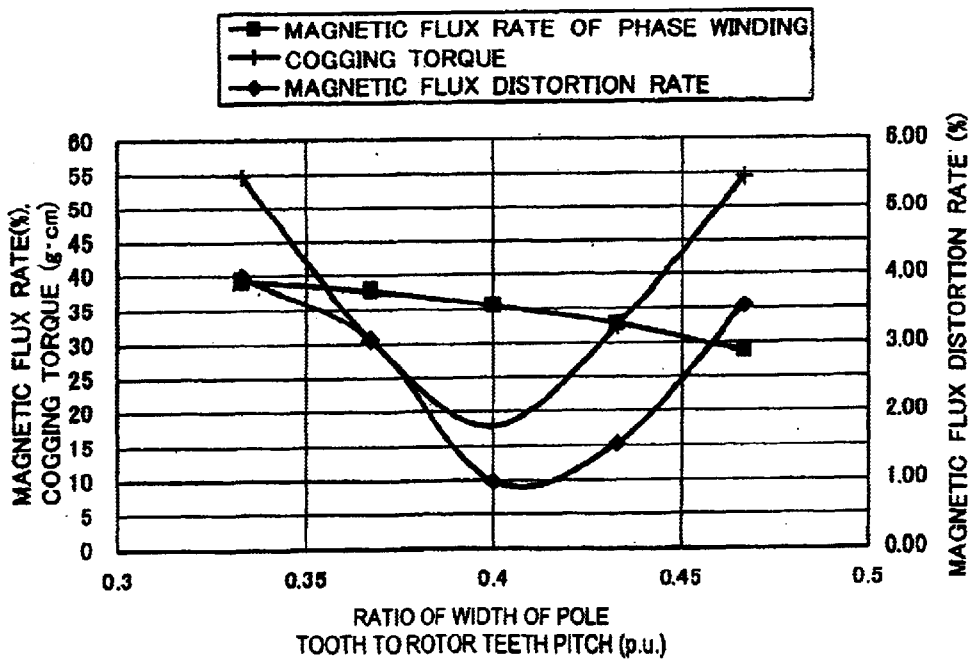
FIG. 6 is a diagram showing characteristic features of the cogging torque, magnetic flux, and distortion rate of the magnetic flux wave form of the three-phase hybrid type stepping motor with six poles having windings.

The width of the pole tooth in the optimum six order vernier system is considered. FIG. 6 shows results of the calculation concerning the small tooth wherein the tooth width of the rotor is considered as the same as that of the stator in order to simplify the calculation. As shown in FIG. 6, the ratio of the small tooth width to rotor teeth pitch of 0.35 –0.45 is most preferable and among the above ratios the ratio of about 0.4 is considered as the best.

As a result of the consideration with respect to the structure of the three-phase hybrid type stepping motor, following results can be obtained, (1) The magnetic flux in case of the six magnetic poles with windings becomes twice as large as that in case of the twelve magnetic poles with windings, so that the propriety of the multiply of the torque is inspected in this respect.

(2) In the vernier system, six order balance is the best with respect to the cogging torque and the magnetic flux.

(3) The ratio of the tooth width with respect to the pitch of about 0.4 of the small teeth is the best, however, the ratio of 0.41 of the normal motor may be adopted with no problem.

The present invention has been obtained by the above considerations.

An object of the present invention is to provide a three-phase hybrid type stepping motor comprising a stator, and a rotor arranged concentrically with the stator and with an air gap therebetween, said stator having an annular stator yoke, six stator poles extending radially and formed at a regular pitch on the inner peripheral surface of the annular stator yoke, and stator windings of three-phase each wound around each stator pole, each of said stator poles having a plurality of small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth. A permeance distribution of the small stator teeth is a vernier pitch balanced by a six order harmonic wave, and a tooth width ratio of the small rotor teeth or the small stator teeth with respect to the pitch of the small rotor teeth is set to 0.35–0.45.

Another object of the present invention is to provide a three-phase hybrid type stepping motor, wherein a permeance distribution of the small stator teeth is a vernier pitch balanced by a three order harmonic wave, and a ratio of tooth width of the small rotor teeth or the small stator teeth with respect to the pitch of the small rotor teeth is set to 0.35–0.45.

A further object of the present invention is to provide a three-phase hybrid type stepping motor, wherein a number of the small rotor teeth is fifty, a number of the small stator teeth is eight, a tooth pitch is 7.05, and a ratio of tooth width of the small rotor teeth or the small stator teeth with respect to the pitch of the small rotor teeth is set to 0.35–0.45.

A three-phase hybrid type stepping motor according to the present invention comprises a stator 5 and a rotor 9 arranged concentrically with the stator 5 and with an air gap therebetween, said stator 5 having an annular stator yoke 1, a plurality of stator poles 2 extending radially and formed at a regular pitch on the inner peripheral surface of the annular stator yoke 1, a plurality of stator poles 2 extending radially and formed at a regular pitch on the inner peripheral surface of the annular stator yoke 1, stator windings 3 of three-phase each wound around each stator pole 2, each of said stator poles 2 having six small stator teeth 4 at the tip end thereof, said rotor 9 having two splitted rotor elements 7 and a permanent magnet 8 held therebetween and magnetized so as to form N and S poles in the axial direction thereof, and fifty small rotor teeth 6 formed at a regular pitch on the outer peripheral surface of each of said rotor elements 7, said two splitted rotor elements 9 being shifted from each other in angular position by ½ pitch of the small rotor teeth 6. A permeance distribution of the six small stator teeth 4 is a vernier pitch balanced by six order harmonic wave, and a ratio of the tooth width of the small stator teeth 4 with the pitch of the small rotor tooth set to 0.35–0.45.

In a further embodiment of the present invention, a permeance distribution of the six small stator teeth 4 is a vernier pitch balanced by three order harmonic wave, and a ratio of the tooth width of the small stator teeth 4 with the pitch of the small rotor tooth is set to 0.35–0.45.

In a further embodiment of the present invention, a number of the small stator teeth 4 is eight, a tooth pitch is 7.05, and a ratio of the small stator teeth 4 to the pitch of the small rotor tooth is set to 0.35–0.45.

As stated above, according to the present invention a three-phase hybrid type stepping motor of a high power, low cogging torque and low distortion rate of the magnetic flux can be obtained.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. In a three-phase hybrid type stepping motor comprising a stator, and a rotor arranged concentrically with the stator and with an air gap therebetween, said stator having an annular stator yoke, six stator poles extending radially and formed at a regular pitch on the inner peripheral surface of the annular stator yoke, and stator windings of three-phase each wound around each stator pole, each of said stator poles having a plurality of small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, a permeance distribution of the small stator teeth is a vernier pitch balanced by a six order harmonic wave, and a ratio of the tooth width with respect to the pitch of the small rotor teeth is set to 0.35–0.45.

2. The three-phase hybrid type stepping motor as claimed in claim 1, wherein a number of the small rotor teeth is fifty, a number of the small stator teeth is eight, a stator tooth pitch is 7.05, and a ratio of the tooth width with respect to the pitch of the small rotor teeth with is set to 0.35–0.45.

3. The three-phase hybrid type stepping motor as claimed in claim 2, the three-phase windings of the stator are connected in the form of delta.

4. The three-phase hybrid type stepping motor as claimed in claim 1, wherein the three-phase windings of the stator are connected in the form of delta.

5. In a three-phase hybrid type stepping motor comprising a stator, and a rotor arranged concentrically with the stator and with an air gap therebetween, said stator having an annular stator yoke, six stator poles extending radially and formed at a regular pitch on the inner peripheral surface of the annular stator yoke, and stator windings of three-phase each wound around each stator pole, each of said stator poles having a plurality of small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, a permeance distribution of the small stator teeth is a vernier pitch balanced by a three order harmonic wave, and a ratio of the tooth width with respect to the pitch of the small rotor teeth is set to 0.35–0.45.

6. The three-phase hybrid type stepping motor as claimed in claim 5, wherein the three-phase windings of the stator are connected in the form of delta.

* * * * *